Patented Aug. 12, 1924.

1,505,044

UNITED STATES PATENT OFFICE.

LEON LILIENFELD, OF VIENNA, AUSTRIA.

INSOLUBLE CELLULOSE ETHER COMPOUND AND PROCESS OF MAKING THE SAME.

No Drawing.  Application filed June 10, 1922. Serial No. 567,429.

*To all whom it may concern:*

Be it known that I, LEON LILIENFELD, citizen of the Republic of Poland, residing at Vienna, Austria, have invented certain new and useful Improvements in Insoluble Cellulose Ether Compounds and Processes of Making the Same, of which the following is a specification.

The present invention rests on the astonishing observation that alkyl derivatives of cellulose or its conversion products which are soluble or swell in water (especially cold water) when treated with many of the albumin-precipitating reagents, and particularly with tanning agents including natural tannins and their substitutes, are capable of forming compounds which are technically useful, these compounds being found to swell but slightly, or not at all, in cold water, and are insoluble therein.

I have established that alkyl celluloses soluble or swelling in water, are precipitated from their solutions or jellies with the simultaneous production of the new type of compounds by a whole series of albumin-precipitating reagents, as for example trichloracetic acid, phosphotungstic acid, chrome alum, potash alum, aluminium sulfate, and especially with tannins, etc.

The compounds of the alkyl cellulose with tannins or tannic acids, which remain insoluble in water even upon long treatment therewith, are found to be especially valuable.

By the present process, the water-soluble alkyl celluloses, either in the crude state, or the articles prepared therefrom, for example films, artificial silk, coatings of all kinds on textiles, paper, leather, etc., sizing on textiles, plastic masses, etc., may be converted into products insoluble in water. Also those alkyl ethers of cellulose or its conversion products, or the articles prepared therefrom, which swell more or less in cold water, may have their property of swelling in water eliminated or greatly decreased.

The present process is therefore suited not only for the alkyl ethers of cellulose which are soluble in water, but also for the alkyl ethers of cellulose which do not dissolve in water at room temperature but which swell in water below 16° C., and particularly in water below 10° C., and even also for those alkyl derivatives of cellulose which show a scarcely perceptible degree of swelling in ice-cold water. Articles made from any of these alkyl ethers are also suitable for use in this process. In the first case the alkyl ethers of cellulose, soluble in water (or the articles made therefrom) are made insoluble in water; in the second case the alkyl ethers of cellulose (or the articles made therefrom) are made non-swelling or only slightly swelling, in the third case alkyl ethers of cellulose or its conversion products (or articles made therefrom) have even their slight property of swelling in ice-cold water, substantially reduced. In each of the three cases, the capacity of the cellulose ethers to be acted upon by water, is reduced.

For execution of the process, for example, the solutions or jellies of the alkyl celluloses or of the alkyl derivatives of the conversion products of cellulose, may be treated with reagents capable of precipitating albumin, particularly tannins or their substitutes (natural tannins or chemically produced substances having tanning properties), and the precipitates thus obtained, after a previous washing, if desired, are either worked up to technical products, which may be accomplished for example by solution in organic solvents such as glacial acetic acid, benzol-alcohol mixture, chloroform, chloroform-alcohol mixture, and the like, or they are dried. The dried products can similarly be worked up later on. The process may also be carried out by treating the alkyl derivatives of cellulose or its conversion products, or the fabricated articles made therefrom or finished articles containing the same, such as artificial threads or yarns, artificial silk, films, plastic masses, threads sized therewith, cloth or paper or leather or the like dressed or coated therewith, or other products may be treated hot or cold with solutions of reagents capable of precipitating albumin, particularly natural tanning materials or their substitutes. They do not lose their transparency and luster thereby, and they may be washed, if desired, and dried without suffering appreciably in appearance. They have attained, however, the valuable property of being insoluble or not swelling or swelling very slightly (less than the original article) in cold water.

Those alkyl celluloses which are soluble in volatile organic solvents, produce, when treated with albumin-precipitating agents, products which also are soluble in volatile organic solvents, and according to the present process, alkyl celluloses which are soluble or swell or only become stretchable upon treatment with very cold water, may be converted into products or articles which are insoluble or non-swelling or which swell even less than the original alkyl celluloses, in water, by adding to the solution of the alkyl cellulose in question, in organic solvents such as for example glacial acetic acid, alcohol, alcohol-benzol mixture, chloroform, alcohol-chloroform mixture or the like, a reagent which precipitates albumin, for example tannic acid, which likewise is soluble in this organic solvent. If a thin uniform layer of this solution be now dried (such solution containing the alkyl cellulose and the reagent which precipitates albumin, for example a tanning material), to form a film; or if it be worked up otherwise in known manner into a technical product or article for example artificial fibers, particularly artificial silk, films, plastic masses, a dressing or coating upon cloth or paper or the like, there results, after a previous washing with water, if desired, a product or an article which is insoluble or non-swelling or only very slightly swelling in water. The operation may be conducted also by precipitating the solution of the alkyl cellulose and the tanning material in the organic solvent with a suitable precipitant, for example water, whereby the new cellulose derivative is precipitated, whereupon, the precipitate is, if desired, washed and dried. The precipitate is soluble in organic solvents and may then be worked up into technical products.

The new derivatives, particularly the compounds of alkyl celluloses with tanning materials (tannin or tannic acid) are not only insoluble and non-decomposable in water but also in weak aqueous alkalies, for example sodium carbonate solution, ammonia, etc. Only solutions of alkali-metal hydrates decompose the new compounds into their components.

The products according to the present process are also suited for therapeutic purposes.

*Example 1.*

To a 5% solution of an ethyl or methyl cellulose soluble in water, for example made according to one of the examples of U. S. Patent No. 1,188,376, are treated with a 10 to 30% solution of tannin in water, preferably with stirring, until nothing more precipitates. An excess of tannin does not hurt. The fibrous, flocculent precipitate is collected on a filtering apparatus and washed with water. Then it is either dried or dissolved in an organic solvent, for example glacial acetic acid, and this solution used for the manufacture of a technical product (for example films, artificial silk, or the like).

*Example 2.*

Like Example 1, with the difference, however, that some formalin (40% solution of formaldehyde), is added, with (or before or after) the tannin solution.

*Example 3.*

A film made from an ethyl or methyl cellulose soluble in water (made for example according to Examples 1 to 7 or Example 11 of the U. S. Patent No. 1,188,376) or artificial silk made therefrom or cloth or paper coated therewith or the like, in the finished state, or in a partly finished condition (for example, still wet), is immersed for 5 minutes to 3 hours in a 3 to 30% solution of tannin in water (or a solution of another tanning material), cold or hot, then preferably washed with water, and dried. There results a product which no longer dissolves in water.

*Example 4.*

An article made from an ethyl cellulose insoluble in water at 16° C., but swelling or even soluble in water below this temperature, particularly below 10° C. (made for example according to the process of the two U. S. applications filed June 10, 1922, Serial Numbers 567,430 and 567,426 on processes for making cellulose derivatives), for example, film, artificial silk, dressed or coated cloth or the like, preferably after a previous swelling in water, are treated as in Example 3. The temperature of the water which is used for swelling depends on the swelling temperature of the alkyl ether used. If an alkyl ether is used which swells in water at 5 to 8° C. but which dissolves in water below 5° C., then water of 5 to 8° C. is used for the swelling. If an alkyl ether is used which swells without dissolving or decomposing in water of 1 to 5° C., then water at 1 to 5° C. is used. The time for swelling depends on the thickness of the article or coating question.

After tanning, a product results which is insoluble in water even below 10° C. and does not swell or swells only slightly therein.

*Example 5.*

The alcoholic solution of an ethyl cellulose swelling or becoming stretchable or even soluble in cold water, is treated with an alcoholic solution of tannic acid or another tanning material, and the clear solution either precipitated with water and the precipitate, after a previous washing if desired, is dried or worked up into a film or into artificial silk or into a plastic mass, or is used for dressing or coating paper or cloth or the like, whereby the solubility or property of swelling in cold water, disappears entirely or is greatly reduced.

The articles treated in the foregoing examples may, besides the cellulose ethers, contain other cellulose derivatives (for example a cellulose hydrate, a cellulose acetate, a cellulose nitrate or the like) or other colloids (for example albumen, fibroin, keratin, glue (gelatine) or the like), or softening agents or plasticizing agents (for example drying or non-drying oils, fats, balsams, phosphoric acid esters of the phenols, high boiling hydro-carbons, camphor, naphthalene or its derivatives, phenol ethers, other high boiling ethers or esters, glycerine, sugars, Turkey red oil, soaps, etc., etc.).

Instead of tannin may be employed:

1. Other substances precipitating albumens, glues, proteids, or alkaloids such as chromium compounds, alums, trichloracetic acid, phosphotungstic acid and the like.

2. Natural tannins and extracts prepared from barks, seeds, fruits, leaves, roots and wood, which produce the tanning of leathers.

3. Many chemically produced substitutes for tannin and natural tanning substances.

Consequently, extracts of oak bark of any kind or constituents thereof, extracts of valonia, extracts of oak wood, extracts of gallnuts, extracts of bark or wood of conifers, extracts of hemlock bark, extracts of birch bark, extracts of willow bark, extracts of acacia bark (for example wattle) extracts of quebracho wood, extracts of sumac, etc., etc., can be employed in the present process instead of tannin.

From the chemically produced substitutes for tannin, suitable for the present process, the following may be mentioned by way of example: condensation products obtained by treating oxy-naphthalene sulphonic acids with phosphorus oxychloride (German Patent 293693) or condensation products manufactured by treating a- or β-naphthol with sulphuric acid or by heating a- or β-naphthol sulphonic acids or a- or β-naphthol in the presence or absence of condensing agents (German Patent 293042), or condensation products of amino-naphthalene monosulphonic acids with formaldehyde (German Patent 293640), or condensation products of amino-oxynaphthalene sulphonic acids with formaldehyde (German Patent 331523), or tanning materials which are formed on treating phenols with neutral sulphites and formaldehyde (German Patent 265855), or tanning materials made by treating phenols or phenol sulphonic acids or mixtures of phenols and phenol sulphonic acids with formaldehyde and sulphuric acid (German Patent 262558) or tanning materials prepared by treating oxysulphonic acids of the benzol- or naphthalene-series with formaldehyde (German Patent 291457), or condensation products which are formed if sulphonic acids of naphthalene or of its homologues are treated with formaldehyde in the presence or absence of condensing agents (German Patent 292531), or condensation products of cresol sulphonic acids which are formed on heating cresol sulphonic acids in vacuo with or without condensing agents (German Patent 265415), or tanning materials prepared by treating dioxydiarylethanes with formaldehyde in the presence of neutral sulphites (German Patent 285772), or condensation products of naphthalene with formaldehyde (German Patent 207743), or tanning materials produced by treating phenol sulphonic acids in the presence or absence of condensing agents (German Patent 260379), etc., etc.

I claim:

1. A cellulose derivative not readily soluble in water, comprising the reaction product of an alkyl cellulose with a reagent capable of precipitating albumin.

2. A cellulose derivative not readily soluble in water which comprises the reaction product of a cellulose ether with a tanning material.

3. A cellulose derivative not readily soluble in water which comprises the reaction product of a cellulose ether with a tannin.

4. A cellulose derivative comprising a reaction product of a cellulose ether which is not entirely resistant to cold water, with a tanning material, such product being more resistant to water than the said cellulose ether.

5. A process which comprises treating a cellulose ether which is not entirely resistant to cold water, with a solution containing a tanning agent.

6. A product containing a cellulose ether which initially was not entirely resistant to cold water, the same being subjected to the action of an agent capable of precipitating albumin, such product being less affected by cold water than the original cellulose ether, as a result of such treatment.

In testimony whereof I affix my signature in presence of two witnesses.

LEON LILIENFELD.

Witnesses:
 CARL WÜDLENBERG,
 CARL LEO CARZEN.